United States Patent
Myers

(12) 
(10) Patent No.: US 6,516,832 B1
(45) Date of Patent: Feb. 11, 2003

(54) METHOD AND APPARATUS FOR TESTING PLUMBING

(76) Inventor: Brian D. Myers, 718 N. Crestline, Spokane, WA (US) 99202

( * ) Notice: Subject to any disclaimer, the term of this patent is extended or adjusted under 35 U.S.C. 154(b) by 0 days.

(21) Appl. No.: 09/948,504

(22) Filed: Sep. 6, 2001

(51) Int. Cl.[7] .................................................. F16L 55/12
(52) U.S. Cl. ............................................. 138/93; 138/94
(58) Field of Search ................................ 138/94, 93, 89

(56) References Cited

U.S. PATENT DOCUMENTS

| | | | | |
|---|---|---|---|---|
| 2,309,429 A | * | 1/1943 | Ahern | 138/93 |
| 3,091,259 A | * | 5/1963 | Alessio | 138/89 |
| 3,431,945 A | * | 3/1969 | Robillard | 138/90 |
| 3,564,103 A | * | 2/1971 | Brachschob et al. | 138/93 |
| 4,013,097 A | * | 3/1977 | Calandra | 138/93 |
| 4,417,598 A | * | 11/1983 | DePirro | 138/93 |
| 4,428,204 A | * | 1/1984 | Brister | 138/89 |
| 4,460,019 A | * | 7/1984 | Condon | 138/90 |
| 4,660,603 A | * | 4/1987 | Tash | 138/92 |
| 5,108,228 A | * | 4/1992 | Miyazaki et al. | 405/154 |
| 5,934,311 A | * | 8/1999 | Brown | 138/93 |

* cited by examiner

*Primary Examiner*—James Hook
(74) *Attorney, Agent, or Firm*—Wells St. John P.S.

(57) ABSTRACT

An apparatus and method for testing plumbing systems is described. The apparatus includes an expandable member which is placed inside a fluid conduit and controllably expanded to temporarily occlude the fluid conduit, a flexible fluid conduit which supplies an expandable member fluid which causes expansion of the expandable member, a movement limiting assembly which prevents the expandable member from moving deeply into the fluid conduit and aids in retrieval of the expandable member, and a sealing assembly which prevents leakage of fluid from the fluid conduit during the testing process. The method of the invention relates to the employment of such a device in testing the integrity of a plumbing system.

16 Claims, 7 Drawing Sheets

FIG. II

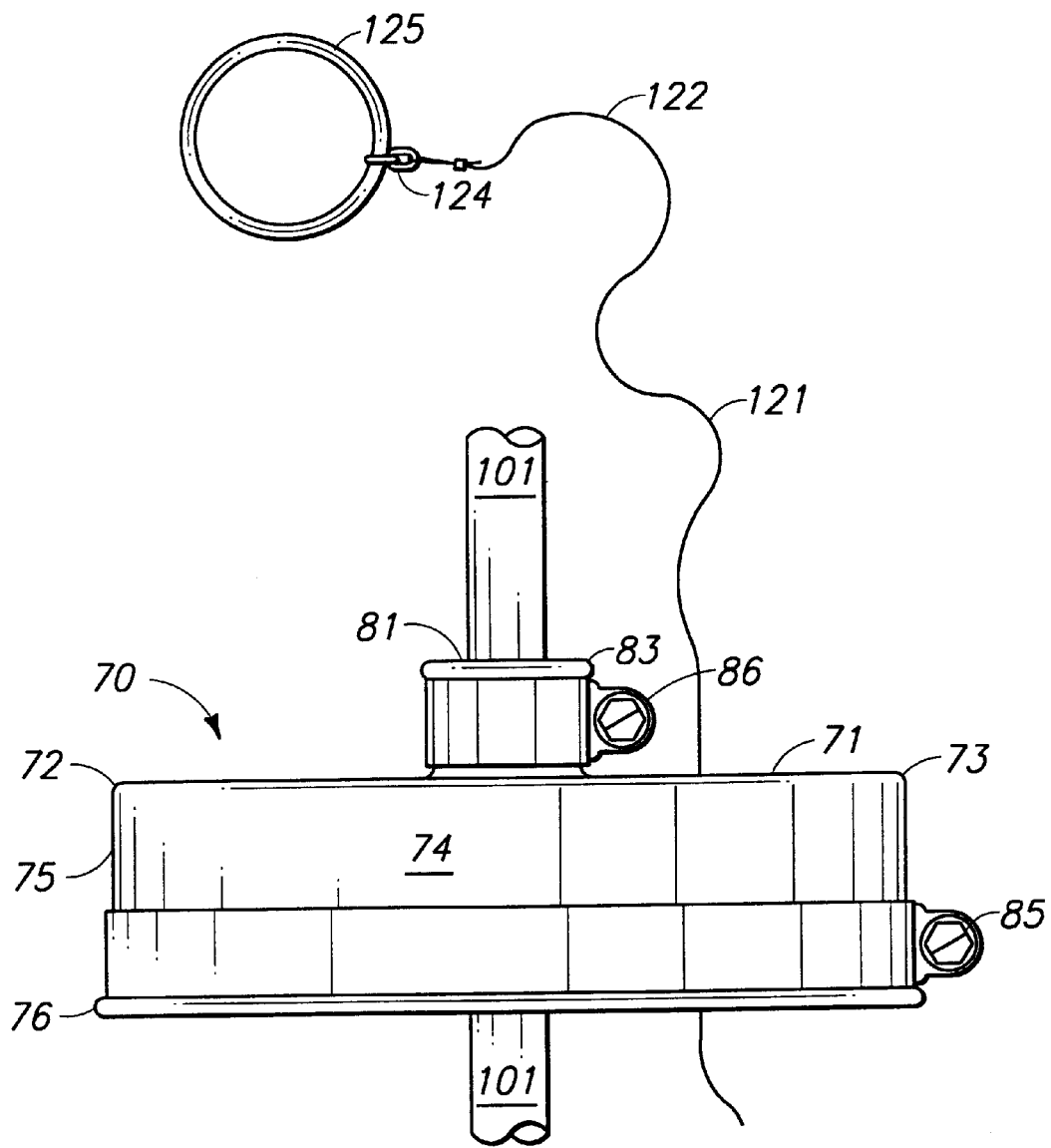

METHOD AND APPARATUS FOR TESTING PLUMBING

TECHNICAL FIELD

The field of this invention relates to plumbing devices and methods for testing plumbing systems, and more specifically to a device and method employed to evaluate the integrity of plumbing systems.

BACKGROUND OF THE INVENTION

Plumbing systems are commonly found in many types of new structures. In fact, most new structures which are intended for human occupation will be constructed to include a wide variety of plumbing features such as: hot and cold running water, indoor toilets, baths, and showers. Similarly, a variety of plumbing features are also frequently found in older structures.

Whether a plumbing system is old or new, at times it may be necessary to test the integrity of the plumbing system. This testing involves checking for a variety of potential plumbing defects. In the case of new construction, it is common practice to test integrity of the plumbing system as soon as the system has been completed. In older structures, the plumbing system may need to be tested periodically in order to locate leaks or other defects.

According to the accepted prior art practices, a plumber would test the integrity of a plumbing system using the method described below. Typically, the plumber would begin by locating the main sewer line which drains the plumbing system which is to be tested. Next, the plumber would locate the sewer clean out opening through which this main sewer line could be accessed. After removing the cover from the sewer clean out opening, the plumber would proceed by inserting an expandable member into the sewer clean out opening, and appropriately position the expandable member within the main sewer line. Once the expandable member was in the proper location within the main sewer line, air would be pumped into the expandable member causing it to expand and temporarily obstruct the main sewer line. After the expandable member was positioned and inflated, the expandable member would prevent fluid from draining from the now isolated plumbing system. The plumbing system would then be pressurized by filling the system with water, and the integrity of the plumbing system would be evaluated.

Once the plumbing system had been throughly inspected, the plumber would release the entrapped air which had been pumped into the expandable member, thereby causing the expandable member to deflate. After the expandable member had been adequately deflated, fluid in the plumbing system is again able to flow under the influence of gravity, around the expandable member, and escape from the plumbing system through the sewer main line.

Ideally, all of the water draining from the plumbing system would exit through the sewer main line. However, this has not been the typical result. Instead, once the expandable member has been deflated, it is common for water to exit the plumbing system by flowing out not only through the sewer main line, but also by rushing out of the sewer clean out opening.

The water escaping through the sewer clean out opening frequently causes several problems. Not only does this water often soak the plumber who is conducting the test, but it may occasionally also cause water damage to the floors and walls surrounding the clean out opening. This undesired result is not only inconvenient, but it can also result in costly damage to subjacent structures, appliances and any other objects which are located in the immediate vicinity.

Another problem commonly encountered during this testing process involves retrieving the expandable member from within the main sewer line. As should be understood, following completion of the test, at the release of the entrapped air, the expandable member may begin to travel along the main sewer line, moving away from sewer clean out opening under the influence of the escaping water. If this member moves far along the sewer line, retrieval of the expandable member may become very difficult.

Although several prior art devices have been developed to test plumbing systems, none of these devices have adequately resolved the problems described above. These and other problems are resolved by means of the present invention which are described more fully hereafter.

SUMMARY OF THE INVENTION

One aspect of the present invention is to provide a method and apparatus for testing the integrity of a plumbing system which will greatly decrease the amount of water escaping through the sewer clean out line, thus preventing or minimizing water damage to the floors, walls, and other objects which surround the sewer clean out line.

Another object of the present invention is to provide an apparatus and method for testing plumbing systems which will help to keep the person who is testing the plumbing system, dry and comfortable during the testing process.

A further aspect of the present invention is to provide an apparatus and method for testing plumbing systems which will substantially inhibit the expandable member from traveling deep into the sewer line, and which will further facilitate retrieval of the expandable member therefrom.

A further aspect of the present invention is to provide a plumbing apparatus for temporarily occluding a fluid conduit to substantially prohibit the movement of a fluid therethrough, and which includes, an expandable member which can be controllably expanded to occlude the fluid conduit and substantially prohibit movement of the fluid therethrough, and which further can be controllably contracted to facilitate movement of the fluid therethrough; a flexible fluid conduit coupled in fluid flowing relation relative to the expandable member, and which is utilized to controllably move an expandable member fluid into or out of the expandable member causing the expansion or contraction of the expandable member; a movement limiting assembly fixed on the expandable member and which limits the movement of the expandable member along the fluid conduit, and a sealing assembly through which the flexible fluid conduit and the movement limiting assembly pass, and which is substantially sealably affixed about the fluid conduit.

A further aspect of the present invention is to provide a plumbing apparatus for temporarily occluding a fluid conduit to substantially prohibit the movement of a fluid therethrough, and which includes, an expandable member which can be positioned in the fluid conduit, and which can be controllably expanded to occlude the fluid conduit and substantially prohibit movement of the fluid therethrough, and which further can be controllably contracted to facilitate the movement of the fluid therethrough; a flexible fluid conduit coupled in fluid flowing relation relative to the expandable member, and which facilitates the delivery of a gas to cause the expandable member to expand, and which further facilitates the release of the gas to cause the expandable member to contract; a movement limiting assembly fixed on the expandable member, and which limits the movement of the expandable member along the fluid conduit; and a sealing assembly through which the flexible fluid conduit and the movement limiting assembly pass, and which is substantially sealably affixed about the fluid conduit to substantially prohibit the escape of the fluid therethrough.

A further aspect of the present invention is to provide a plumbing apparatus for temporarily occluding a fluid conduit to substantially prohibit the movement of a fluid therethrough, and which includes, an expandable member which has a first state, where it has a first dimension which permits it to be received-within the fluid conduit which is to be occluded, and a second state, where it has a second dimension which substantially completely occludes the fluid conduit; a flexible fluid conduit coupled in fluid flowing relation relative to the expandable member, and which facilitates the delivery of an expandable member fluid to cause the expandable member to move to the second state, and which further facilitates the release of the expandable member fluid to cause the expandable member to move to the first state; a movement limiting assembly fixed on the expandable member, and which limits the movement of the expandable member along the fluid conduit; and a sealing assembly through which the flexible fluid conduit and the movement limiting assembly pass, and which is substantially sealably affixed about the fluid conduit to substantially prohibit the escape of the fluid therethrough.

Still another aspect of the present invention is to provide a method for temporarily occluding a fluid conduit to substantially prohibit the movement of a fluid therethrough, and which includes, inserting an expandable member into the fluid conduit; providing a flexible fluid conduit coupled in fluid flowing relation relative to the expandable member and which is utilized to move an expandable member fluid into or out of the expandable member to cause the expansion or contraction of the expandable member; causing the expandable member to expand and substantially obstruct movement of the fluid in the fluid conduit; providing a movement limiting assembly affixed to the expandable member and which limits movement of the expandable member along the fluid conduit; and providing a sealing assembly which substantially limits escape of the fluid, and through which the flexible fluid conduit and the movement limiting assembly pass.

Yet a further aspect of the present invention is to provide a method for temporarily occluding a fluid conduit to substantially prohibit the movement of a fluid therethrough, and which includes, positioning an expandable member within the fluid conduit; providing a flexible fluid conduit coupled in fluid flowing relation relative to the expandable member, and which facilitates the delivery of an expandable member fluid to cause the expandable member to expand, and which further facilitates the release of the expandable member fluid to cause the expandable member to contract; causing the expandable member to expand and substantially obstruct the movement of the fluid in the fluid conduit; providing a movement limiting assembly affixed to the expandable member which limits movement of the expandable member along the fluid conduit; affixing a sealing assembly to the fluid conduit which substantially limits escape of the fluid, and through which the flexible fluid conduit and the movement limiting assembly pass; causing the expandable member to contract, to facilitate the movement of the fluid through the fluid conduit; removing the sealing assembly from the fluid conduit; and removing the expandable member from within the fluid conduit.

These and other aspects of the present invention will be discussed in further detail below.

BRIEF DESCRIPTION OF THE DRAWINGS

Preferred embodiments of the invention are described below with reference to the following accompanying drawings.

FIG. 7 is a vertical sectional view of the sealing assembly shown in

FIG. 6, and which is taken from a position along line 7–7 thereof.

FIG. 8 is a fragmentary, side elevational view of the sealing assembly and movement limiting assembly of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
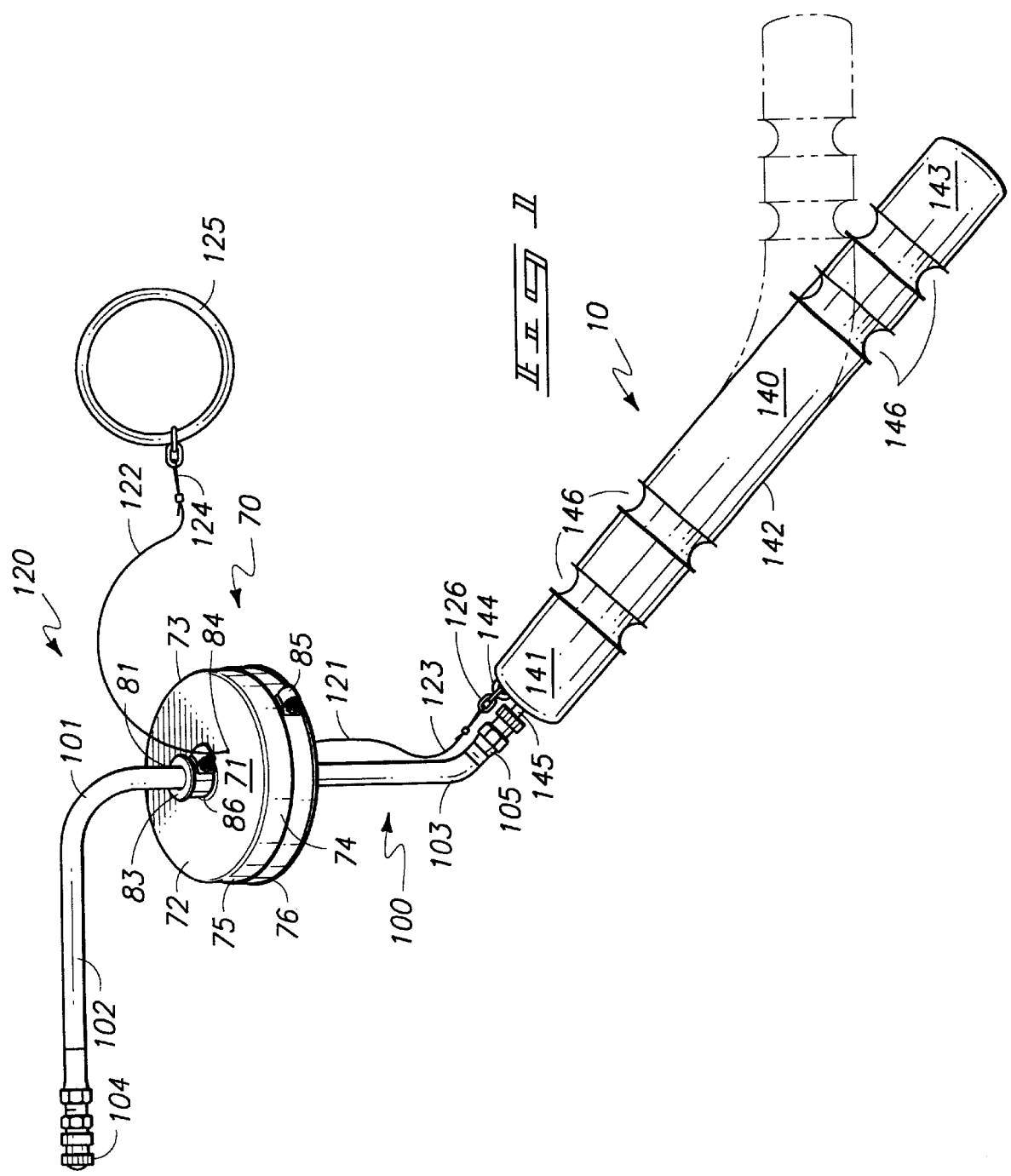
FIG. 1 is a perspective view of the apparatus of the present invention shown in isolation.
Figure 2:
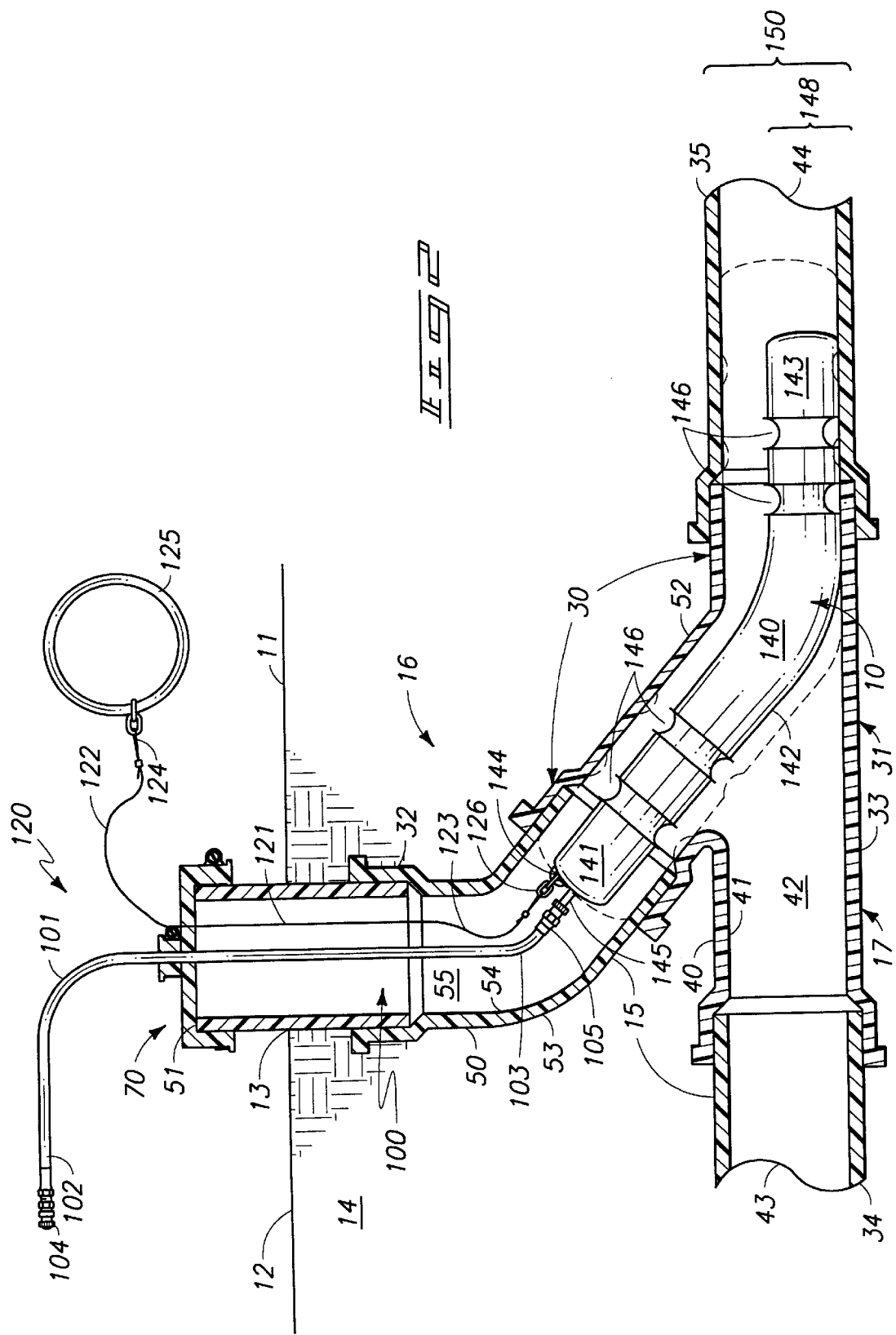
FIG. 2 an environmental vertical sectional view of the apparatus of the present invention, showing the apparatus positioned within a fluid conduit, and having two operational states.

Referring now to FIGS. 1 and 2, the apparatus of the subject invention is generally indicated by the numeral 10. As shown therein, and referring now to FIG. 2, the surface of the earth, or other supporting surface which may be fabricated from man made or other natural materials is shown generally by the numeral 11. The surface of the earth or other supporting surface has a top surface 12 and an aperture or other opening 13 is formed through the top surface thereof. The surface of the earth or other supporting surface has a subsurface component generally indicated by the numeral 14. A channel or other passageway is formed by excavation or other suitable technique is formed through the subsurface 14 in order to define a first course 16 and a second course generally indicated by the numeral 17.

Figure 3:
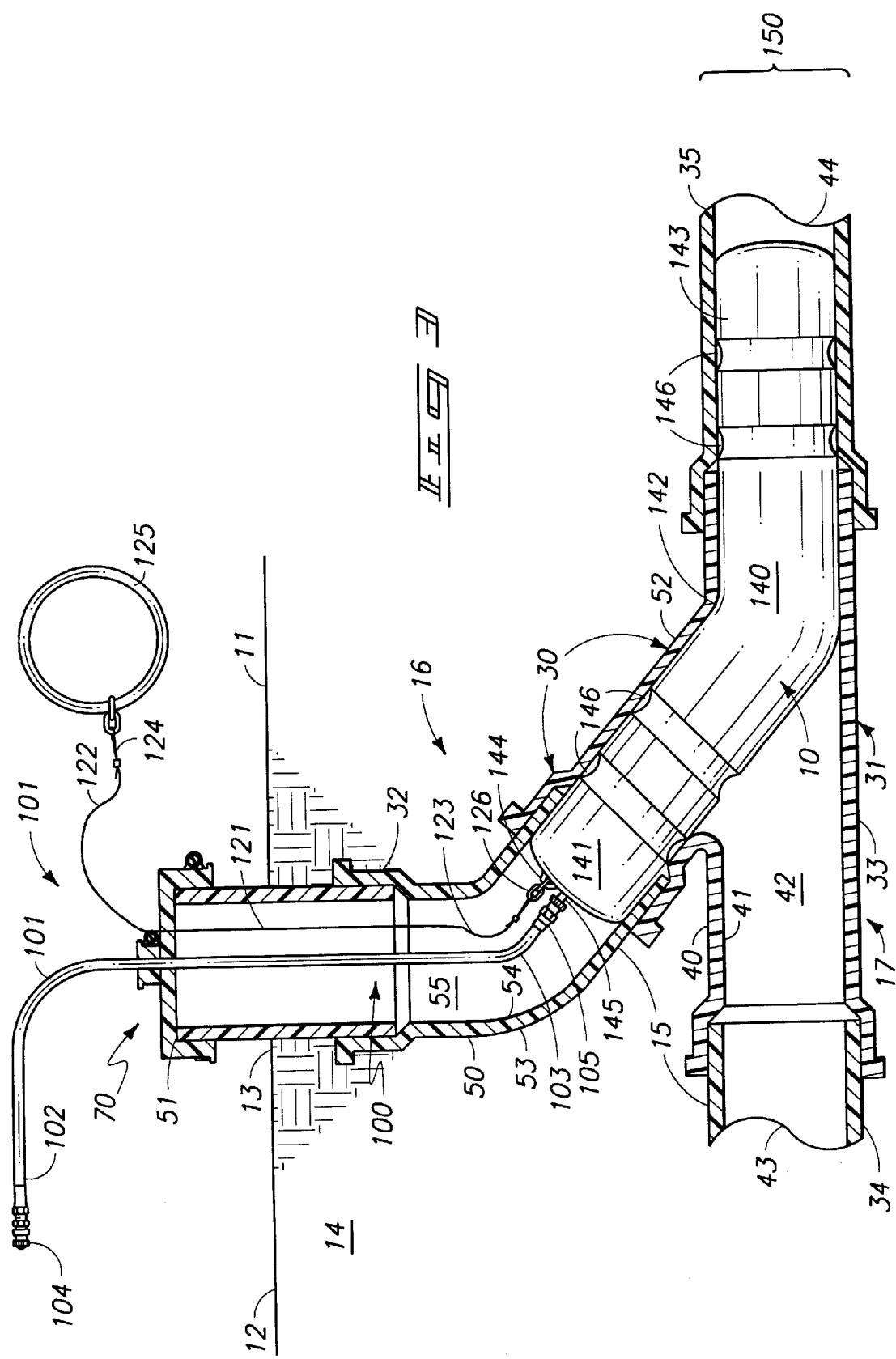
FIG. 3 is a second environmental vertical sectional view of the apparatus of the present invention, showing the apparatus positioned within a fluid conduit in one of its operational states.
Figure 4:
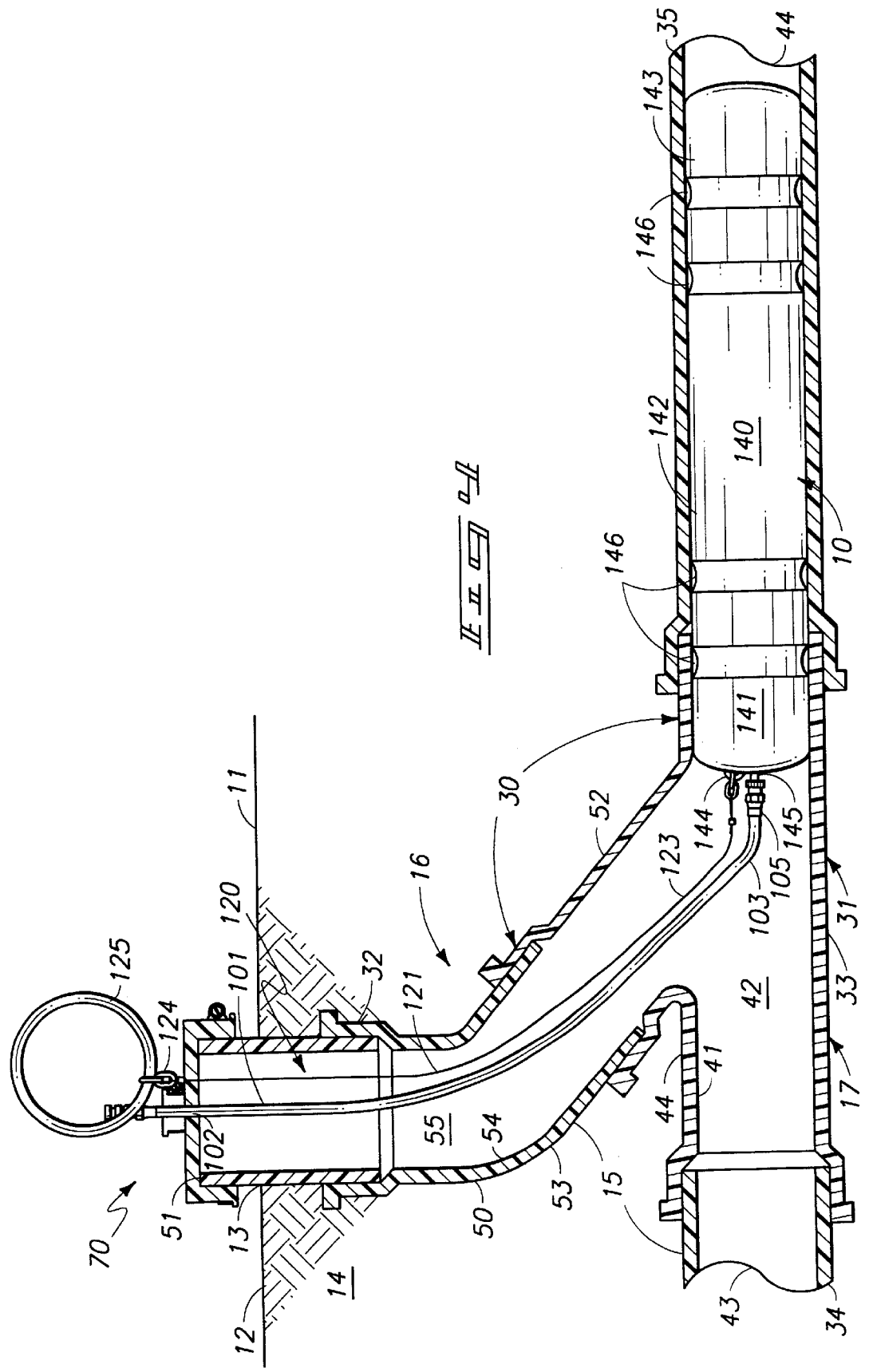
FIG. 4 is a third environmental vertical sectional view of the apparatus of the present invention, showing the apparatus positioned deep inside a fluid conduit, and also showing the operation of the movement limiting assembly.

As best seen in FIGS. 2, 3 and 4, a fluid conduit is generally indicated by the numeral 30. The fluid conduit 30 includes a primary, or first, fluid conduit 31 and a secondary, second or branch fluid conduit indicated by the numeral 32. As seen in the drawings, the primary and secondary fluid conduits form a generally "Y" shaped configuration although other configurations such as a "T" shaped configuration are possible. Whatever the form of the two conduits, the conduits must assume a shape or geometry which permits the apparatus of the present invention to be inserted therein and to occupy locations within each of the fluid conduits simultaneously. The specifics of the construction of the apparatus of the present invention will be discussed in greater detail hereinafter.

As seen in FIGS. 2, 3 and 4, the primary or first fluid conduit 31 has a main body generally indicated by the numeral 33. The main body 33 may comprise multiple mating sections, as illustrated, and which form a substantially continuous conduit. Whatever form it assumes, the main body 33 has a first end 34 and opposite second end 35. Still further, the main body includes an exterior surface 40 and an opposite interior surface 41 which defines an inside diameter.for the main body. The inside facing surface defines a fluid passageway 42 which extends between the first and second ends 34 and 35 thereof. The first end comprises an intake end 43, and the second end comprises an exhaust end 44 for the fluid conduit.

As seen in FIGS. 2, 3 and 4, it will be seen that the fluid conduit which is generally indicated by the numeral 30 includes a secondary, second, or branch fluid conduit 32, which has a main body 50. The main body 50 has a first end, clean out, access, or fluid conduit opening indicated by the numeral 51, and a second, distal or opposite end 52 which is coupled in fluid flowing relation relative to the primary or first fluid conduit 31 as illustrated. The main body 50 is defined by an exterior surface 53 and an opposite interior surface 54 which forms an inside diameter dimension for the fluid passageway 55. As illustrated, the fluid passageway 55 is coupled in fluid flowing relation relative to the fluid passageway 42 thereby providing a means by which a plumber, or other artisan, can gain access by means of the first end 51 to the primary conduit. As seen in FIGS. 2, 3 and 4, it will be seen that the main body 50 is illustrated as being fabricated, or otherwise installed, as a sectional construction, that is, individual sections come together in mating relation to provide a substantially continuous conduit. As discussed in the paragraph immediately above regarding the construction of the primary conduit 31, it will be recognized that this may be fabricated as a substantially continuous construction or in the manner of sectional construction as illustrated.

Referring now more specifically to FIGS. 5–8, a sealing assembly for use with the present invention 10 is shown. The sealing assembly is generally indicated by the number 70. As seen clearly by FIGS. 2–4, the sealing assembly releasably sealably couples or mates about the first end 51 to substantially limit or prevent the escape of fluid therefrom. Still further, it is operable to receive a flexible fluid conduit therethrough for the purposes which will be discussed in greater detail hereinafter.

The sealing assembly 70 has a main body generally indicated by the numeral 71 and which, as indicated above, releasably sealably mates on or about the branch fluid conduit 32. The main body is fabricated from a suitable elastomeric, thermoformable compound such that it may be deformed to sealably mate about the branch fluid conduit 32. The main body may be fabricated from other materials depending upon the conduit that it is to be mated to. For example, if the branch fluid conduit 32 is fabricated in such a fashion as to have a thread formed about the first end thereof, it is possible that the main body may be fabricated of a similar material with a threadable mating surface such that the main body 71 can mate suitably with same and to prevent the escape of fluid therefrom. The main body 71 includes a top surface 72 which is defined by a peripheral edge 73. As seen in the sectional view of FIG. 7, the main body includes a depending sidewall 74 and further, the depending sidewall 74 is defined by an exterior surface 75 which includes an outwardly extending flange which is generally indicated by the numeral 76. The depending sidewall 74 further has an inside facing surface 80 which defines an inside diameter which is generally just slightly greater in dimension than that of the outside diameter of the first end 51 with which it mateably cooperates.

Figure 5:
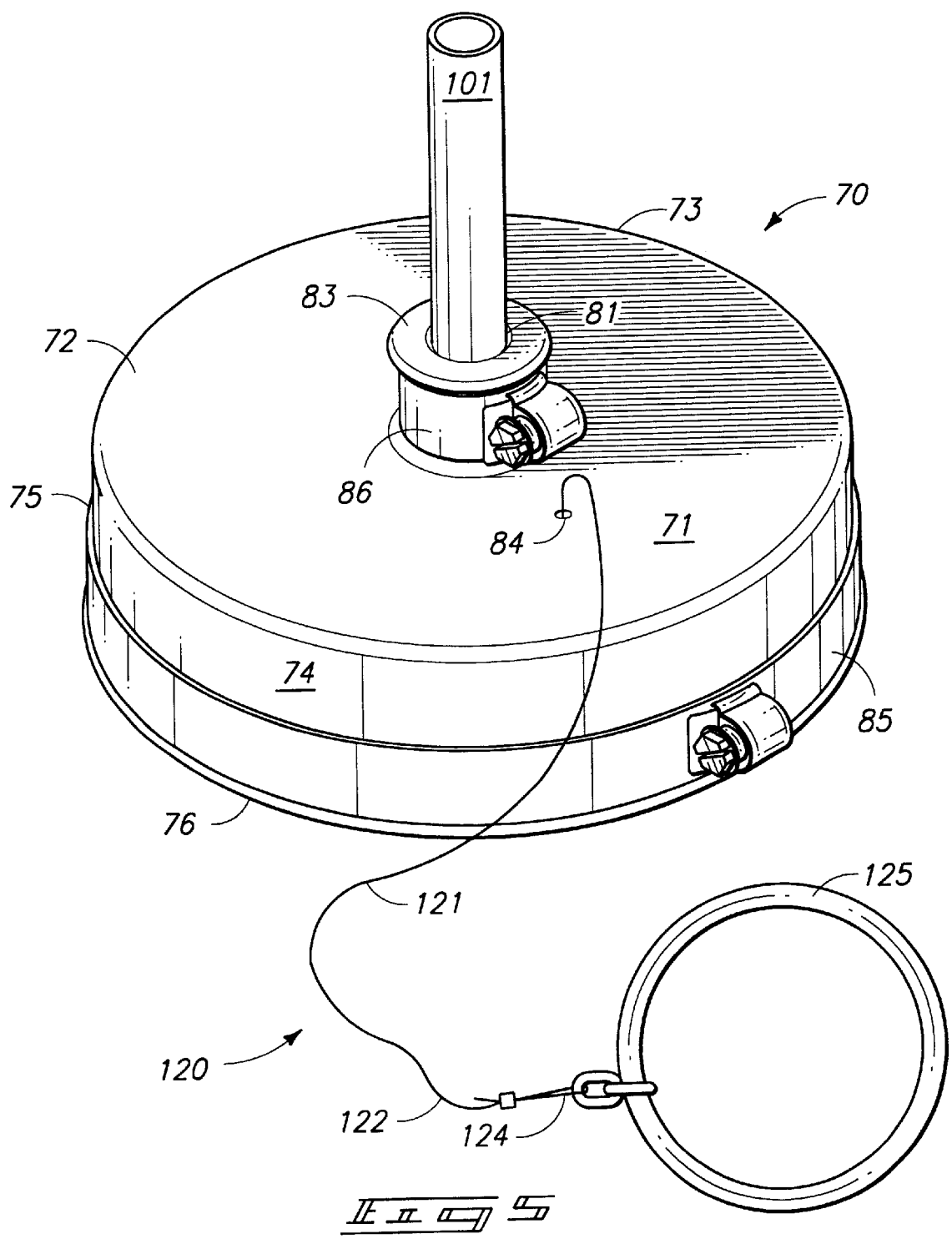
FIG. 5 is a perspective view of a sealing assembly utilized with the present invention.
Figure 6:
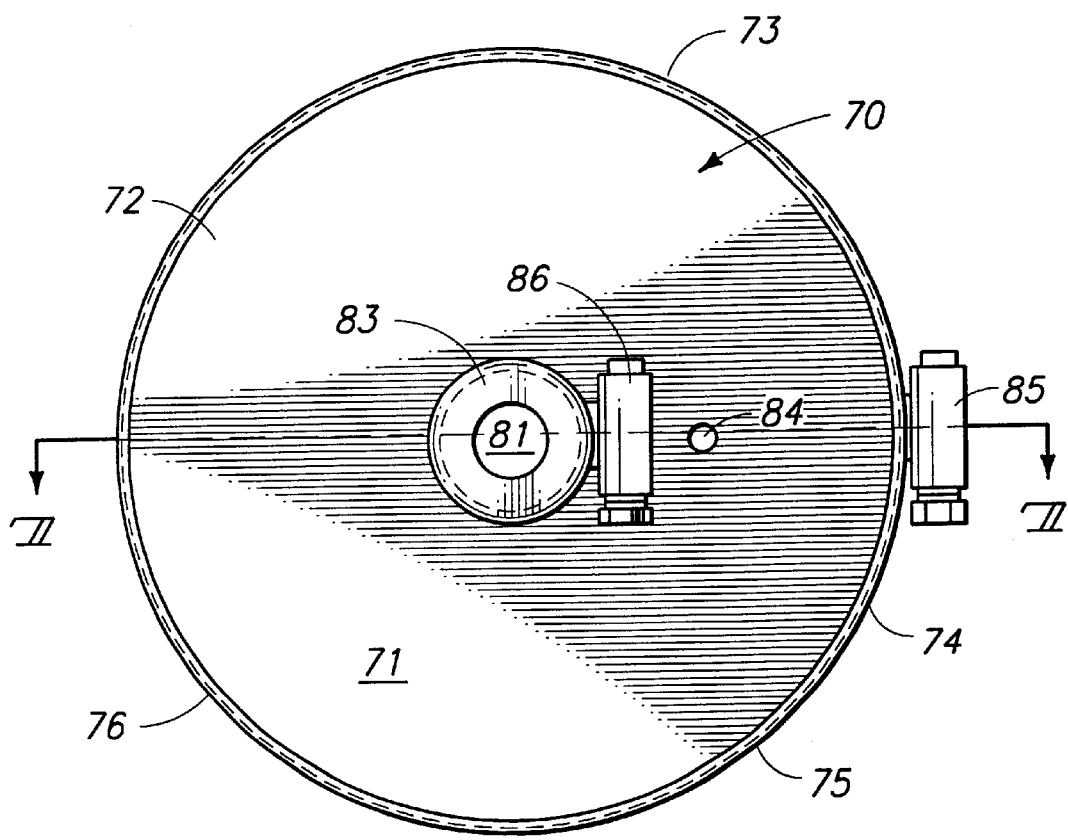
FIG. 6 is a top, plane view of the sealing assembly shown in FIG. 5.
Figure 7:
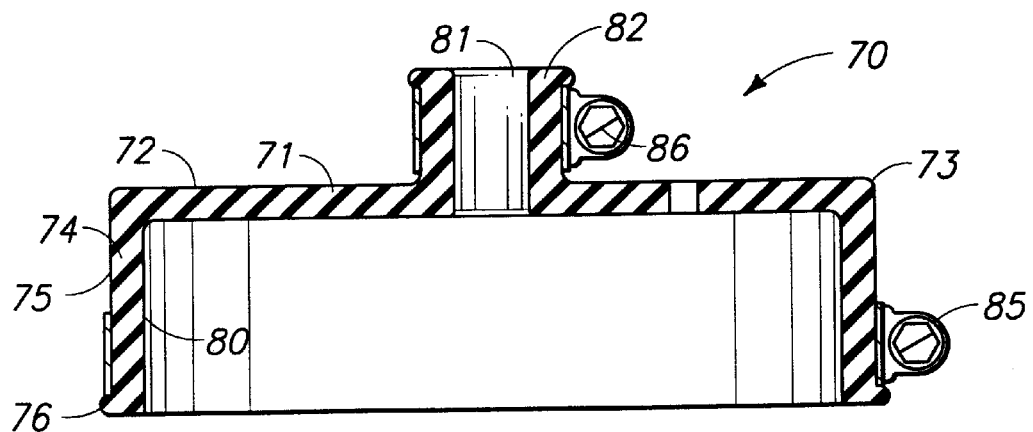

As best seen in FIG. 5 and in the sectional view of FIG. 7, a fluid passageway or flexible fluid conduit opening 81 extends substantially normally outwardly relative to the top surface 72. The fluid passageway 81 is defined by a peripheral sidewall 82 which is substantially deformable for the purposes which will be discussed hereinafter. As seen in FIG. 7 a flange 83 extends lateral outwardly from the peripheral sidewall. Yet further, and as seen in FIGS. 5 and 7, a cable passageway or movement limiting assembly passageway 84 is formed through the top surface and extends therethrough to accommodate a cable which also will be discussed in greater detail hereinafter. The sealing assembly 80 also includes a first hose clamp 85 which is received about the depending sidewall 74 as shown in FIG. 5, and a second hose clamp 86 which is received about the peripheral wall 82 which defines the fluid passageway 81. These hose clamps are of conventional design and the screw threadable tightening of same permits force to be exerted by these specific structures on the depending sidewall in order to allow the sealing assembly 70 to sealably mate about the structures that are adjacent thereto.

Referring now to FIGS. 1, 2, and 3, a flexible fluid conduit assembly is generally indicated by numeral 100. As seen in the drawings, the flexible fluid conduit assembly 100 includes a flexible fluid conduit, hose, or tube which is indicated by the numeral 101. As best shown in FIG. 5, the flexible fluid conduit 101 is shown to pass through the flexible fluid conduit opening 81 of the sealing assembly 70. FIG. 5 shows only a small section of flexible fluid conduit 101 as it passes through the flexible fluid conduit opening 81. As discussed above, second hose clamp 86 may be tightened so that the sealing assembly will sealably mate about the flexible fluid conduit.

Now referring to FIGS. 2 and 3, it can be seen that the flexible fluid conduit, or tube 101 includes a first end 102 which extends outside of fluid conduit 30, and a second or opposite end 103. As shown in the drawings, first end 102 has an intake/exhaust valve 104 which can be used in one aspect of operation of the invention to introduce air or another suitable gas or liquid into the flexible fluid conduit, and in another aspect of operation of the invention to release a suitable gas or liquid from the flexible fluid conduit. Still further, the second end 103 has a female valve receptacle or coupling device 105 which serves to couple the flexible fluid conduit in fluid flowing relation with the expandable member which will be discussed in greater detail hereinafter.

Referring now to FIGS. 1, 2 and 3, a movement limiting assembly for use with the present invention is generally indicated by the numeral 120. As shown in the drawings, the movement limiting assembly includes a cable or connector 121 which passes through the cable passageway 84 of the sealing assembly 70. The cable or connector 121 has a first end 122 which extends outside of fluid conduit 30, and a second end 123 which is shown positioned within the fluid conduit 30. As best shown in FIG. 5, after cable 121 has passed through the cable passageway 84 to extend outside of the fluid conduit 30, a first fastening device or fastener 124 serves to attach an end piece or handle 125 to the first end 122 of the cable 121. The handle or end piece is shown in the drawing as a ring having a diameter greater that the inside dimension of the first end or fluid conduit opening 51. This dimensional relationship assures that the handle will not pass into the fluid conduit opening 51. The handle or end piece may be fabricated from assorted materials such as metal, and other rigid man-made compositions. Typically the handle will have a diametral dimension greater than four and one-half inches.

Again referring to FIGS. 2 and 3, the cable or connector 121 has a second end 123 which is shown positioned within the fluid conduit 30. The second end 123 is attached by way of a second fastening device or fastener 126 to an the expandable member which will be discussed in greater detail hereinafter.

In the preferred embodiment, the cable 121 is fabricated of metal. However, the cable 121 may be constructed of other materials, and may be of various lengths. If the cable 121 is constructed of materials other than metal, these alternative materials must be durable to withstand exposure to water and further effectively restrain the movement of the expandable member along the fluid conduit 30.

As shown in FIG. 3, when the expandable member 140 is properly positioned in the fluid conduit 30 a section of the cable 121 will normally protrude from the cable passageway 84, extending outside of the fluid conduit opening 51. However, as shown best in FIG. 4, when the expandable member 140 travels along the fluid conduit 30, and moves further away from the fluid conduit opening 51, the handle or end piece 125 of the movement limiting assembly 120 will be in apposition or juxtaposition with the main body 71 of the sealing assembly 70. In this situation, the main body of the sealing assembly 71 prevents the handle 125 from entering the fluid conduit 30. As shown in FIG. 4, once the handle 125 has limited the movement of the expandable member 140, the plumber or other artisan may grasp the handle 125 and pull on same to retrieve the expandable member which is then deep within the fluid conduit 30.

Referring now to FIGS. 1–4, the expandable member is generally indicated by the numeral 140. As shown in FIG. 1, the expandable member 140 is a generally an elongated balloon-like structure having a first part or portion 141, a second or middle part or portion 142, and a third part or portion 143. Each of these three portions 141, 142, and 143 are separated by a pair of circumferential grooves or channels 144. The first part 141 has a male valve stem 145 which is releasably coupled in fluid flowing relation with the flexible fluid conduit 101. This male valve stem 145 is the only entrance or fluid passageway into the hollow interior of the expandable member 140. Also positioned on the first portion 141 is a fastener loop 146 which serves as a point of attachment for the cable 121 of the movement limiting assembly 120. In the preferred embodiment, the expandable member 140 is fabricated from a suitable elastomeric compound which is impervious to fluids and gases, so that it may be inflated with air or filled with another suitable gas or fluid under pressure, so that it will expand in the circumferential dimensions and longitudinally.

As best shown in FIG. 1, when not employed, the expandable member assumes a generally linear configuration. However, as best seen in FIG. 2, the expandable member is somewhat flexible so that it may conform to the shape or geometry of the fluid conduit 30 into which it will be inserted. As seen in phantom lines in FIG. 1, the expandable member 140 may flex at or about the second or middle portion 142 so that it may be inserted into fluid conduits having various shapes or geometries. Although FIG. 1 shows the expandable member 140 flexing only at the second or middle part 142, the other portions of the expandable member 140 are similarly flexible about the longitudinal axis.

Now referring to FIGS. 2 and 3 respectively, where some features of the operation of the expandable member 140 are show, it will be seen that-the expandable member 140 is inserted into the fluid conduit 30 by passing the expandable member 140 through the fluid conduit opening 51. Once the expandable member 140 is properly located within the fluid conduit 30, the sealing assembly 70 is releasably sealably affixed about the fluid conduit opening 51 to substantially prevent the escape of fluid therefrom. As shown in the figures, the expandable member 140 is received within the fluid conduit 30 which is to be temporarily occluded, and the sealing assembly 70 has been affixed about the fluid conduit opening 51.

As best understood by a study of FIGS. 2 and 3, in the preferred embodiment, the expandable member 140 may be temporarily inflated with air under pressure to cause the expandable member 140 to expand and occlude the fluid conduit 30. This expansion substantially prohibits the movement of any fluids therethrough. However, other suitable gases or fluids under pressure may be used in place of air to cause the expandable member 140 to expand. In the preferred embodiment, an air pump is attached to the intake/exhaust valve 104, so that air may be pumped into the first end 102 of the flexible fluid conduit 101, and then flow through the flexible fluid conduit or tube 101, and into the expandable member 140, causing the expandable member to expand to a size which occludes the vessel or fluid conduit.

Referring now to FIG. 2, prior to inflating the expandable member 140 with air under pressure, the expandable member 140 is in its first state. In its first state, the expandable member 140 has a first dimension or first diameter 148 which allows it to be received within the fluid conduit 30. The first dimension is indicated in FIG. 2 by a bracket and the numeral 148. Still referring to FIG. 2, the expandable member also has a second state (shown by phantom lines), in which it has a second dimension or second diameter 150 which substantially completely occludes the fluid conduit 30. The second dimension is indicated in FIG. 2 by a bracket and the numeral 150.

Referring now to FIG. 3, the expandable member 140 is shown positioned within the fluid conduit 30, where it is substantially completely occluding the fluid conduit 30. In the preferred embodiment, if fluid conduit 30 is the main sewer line which drains a particular plumbing system, once the expandable member 140 has temporarily occluded the sewer main line, the pluming system behind the expandable member may be filled with water so that the integrity of the plumbing system may be evaluated.

When the evaluation of the plumbing system has been completed, the air under pressure may be release through the intake valve 104, causing the expandable member 140 to return to its first state as shown in FIG. 2. When the expandable member 140 returns to the first state, it will have a first dimension or first diameter 148 which will not substantially completely occlude the fluid conduit 30. Therefore, fluid may once again flow under the influence of gravity, flowing around the expandable member 140, and exiting through the fluid conduit 30. However, because the sealing assembly is 70 is releasably sealably affixed about the fluid conduit opening 51, the escape of fluid through the fluid conduit opening 51 is substantially prevented.

OPERATION OF THE PREFERRED EMBODIMENTS

The operation of the described embodiments of the present invention is believed to be readily apparent and is briefly summarized at this point. In the broadest aspect, the present invention relates to a plumbing apparatus 10 for temporarily occluding a fluid conduit 30 to substantially prohibit the movement of a fluid therethrough. The plumbing apparatus 10 includes an expandable member 140 which can be controllably expanded to occlude the fluid conduit 30 substantially prohibiting movement of the fluid therethrough; a flexible fluid conduit or tube 101 coupled in fluid flowing relation relative to the expandable member 140, which may be utilized to controllably move an expandable member fluid such as air under pressure, into or out of the expandable member 140 causing the expansion or contraction of the expandable member 140; a movement limiting assembly 120 fixed on the expandable member 140, which serves to limit the movement of the expandable member 140 along the fluid conduit 30; and a sealing assembly 70 through which the flexible fluid conduit 101 and the movement limiting assembly 120 pass, and which is substantially sealably affixed about the fluid conduit 30. As noted above, the expandable member fluid which causes expansion of the expandable member 140 is supplied under pressure. Further, the expandable member 140 has a first state, where it has a first dimension 148 which permits it to be received within the fluid conduit 30 which is to be occluded, and a second state, where it has a second dimension 150 which substantially completely occludes the fluid conduit 30. As disclosed above, the movement limiting assembly 31 has an end piece 125 which has a diameter greater than the inner diameter of the first end 51, and which further cannot pass through the sealing assembly 70. Still further, the sealing assembly 70 includes a flexible fluid conduit opening 81 which is substantially sealable fixed about the flexible fluid conduit 101. A clamping device or a first hose clamp 86 is provided to affix the sealing assembly 70 to the fluid conduit 30.

Another aspect of the present invention relates to a plumbing apparatus 10 which includes an expandable member 140 which can be positioned in the fluid conduit 30, and which can be controllably expanded to occlude the fluid conduit 30 substantially prohibiting movement of the fluid therethrough, and which further can be controllably contracted to facilitate the movement of the fluid therethrough; a flexible fluid conduit 101 coupled in fluid flowing relation relative to the expandable member 140, and which facilitates the delivery of a gas to cause the expandable member 140 to expand, and which further facilitates the release of the gas to cause the expandable member 140 to contract; a movement limiting assembly 120 fixed on the expandable member 140, and which limits the movement of the expandable member 140 along the fluid conduit 30; and a sealing assembly 70 through which the flexible fluid conduit 101 and the movement limiting assembly 120 pass, and which is substantially sealably affixed about the fluid conduit 30 to substantially prohibit the escape of the fluid therethrough. As noted above, the expandable member fluid which causes expansion of the expandable member 140 is supplied under pressure. Further, the expandable member 140 has a first state, where it has a first dimension 148 which permits it to be received within the fluid conduit 30 which is to be occluded, and a second state, where it has a second dimension 150 which substantially completely occludes the fluid conduit 30. As disclosed above, the movement limiting assembly 120 has an end piece 125 which has a diameter greater than 4.5 inches, and which cannot pass through the sealing assembly 70. Still further, the sealing assembly 70 includes a flexible fluid conduit opening 81 which is substantially sealable about the flexible fluid conduit 101. A clamping device 85 affixes the sealing assembly 70 to the fluid conduit 30.

In another aspect, the present invention relates to a plumbing apparatus 10 for temporarily occluding a fluid conduit 30 to substantially prohibit the movement of a fluid therethrough, and which includes an expandable member 140 which has a first state, where it has a first dimension 148 which permits it to be received within the fluid conduit 30 which is to be occluded, and a second state, where it has a second dimension 150 which substantially completely occludes the fluid conduit 30; a flexible fluid conduit 101 coupled in fluid flowing relation relative to the expandable member 140, and which facilitates the delivery of an expandable member fluid to cause the expandable member 140 to move to the second state, and which further facilitates the release of the expandable member fluid to cause the expandable member 140 to move to the first state; a movement limiting assembly 120 fixed on the expandable member 140, and which limits the movement of the expandable member 140 along the fluid conduit 30; and a sealing assembly 70 through which the flexible fluid conduit 101 and the movement limiting assembly 120 pass, and which is substantially sealably affixed about the fluid conduit 30 to substantially prohibit the escape of the fluid therethrough. As noted above, the expandable member fluid which causes expansion of the expandable member 140 is supplied under pressure, and is typically a gas. Furthermore, the movement limiting assembly 120 is of a predetermined length. As disclosed above, the movement limiting assembly 120 has an end piece 125 which prohibits the movement of the expandable member to a location where it cannot be retrieved.

In yet another aspect, the present invention relates to a method for temporarily occluding a fluid conduit 30, to substantially prohibit the movement of a fluid therethrough, which includes inserting an expandable member 140 into the fluid conduit 30; providing a flexible fluid conduit 101 coupled in fluid flowing relation relative to the expandable member 140 which is utilized to move an expandable member fluid into or out of the expandable member 140 to cause the expansion or contraction of the expandable member 140; causing the expandable member 140 to expand and substantially obstruct movement of the fluid in the fluid conduit 30; providing a movement limiting assembly 120 affixed to the expandable member 140 which limits movement of the expandable member 140 along the fluid conduit 30; and providing a sealing assembly 70 which substantially limits escape of the fluid, and through the flexible fluid conduit 101 and the movement limiting assembly 120 pass. As noted above, the expandable member fluid which causes expansion of the expandable member 140 is supplied under pressure, and release of the expandable member fluid will cause the expandable member 140 to contract. The method may further comprise sealably affixing the sealing assembly 70 to limit the escape of the fluid from within the fluid conduit 30.

In yet another aspect, the present invention relates to a method for temporarily occluding a fluid conduit 30 to substantially prohibit the movement of a fluid therethrough, and which includes positioning an expandable member 140 within the fluid conduit 30; providing a flexible fluid conduit 101 coupled in fluid flowing relation relative to the expandable member 140, and which facilitates the delivery of an expandable member fluid to cause the expandable member 140 to expand, and which further facilitates the release of the expandable member fluid to cause the expandable member 140 to contract; causing the expandable member 140 to expand and substantially obstruct the movement of the fluid in the fluid conduit 30; providing a movement limiting assembly 120 affixed to the expandable member 140 which limits movement of the expandable member 140 along the fluid conduit 30; affixing a sealing assembly 70 to the fluid conduit 30 which substantially limits escape of the fluid, and through which the flexible fluid conduit 101 and the movement limiting assembly 120 pass; causing the expandable member 140 to contract, thus facilitating movement of the fluid through the fluid conduit 30; removing the sealing assembly 70 from the fluid conduit 30; and removing the expandable member 140 from within the fluid conduit 30. As noted above, the expandable member fluid which causes expansion of the expandable member 140 is supplied under pressure, and release of the expandable member fluid will cause the expandable member 140 to contract.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A plumbing apparatus for temporarily occluding a fluid conduit to substantially prohibit the movement of a fluid therethrough, comprising:
    an expandable member which can be controllably expanded to occlude the fluid conduit and substantially prohibiting the movement of the fluid therethrough, and which further can be controllably contracted to facilitate the movement of the fluid therethrough;
    a flexible fluid conduit coupled in fluid flowing relation relative to the expandable member, and which is utilized to controllably move an expandable member fluid into or out of the expandable member causing the expansion or contraction of the expandable member;
    a movement limiting assembly fixed on the expandable member, and which limits the movement of the expandable member along the fluid conduit; and
    a sealing assembly through which the flexible fluid conduit and the movement limiting assembly pass, and which is substantially sealably affixed about the fluid conduit, and wherein the movement limiting assembly has an end piece which cannot pass through the sealing assembly.

2. An apparatus as claimed in claim 1, wherein the end piece is circular in shape and has a diameter greater than about 4.5 inches.

3. An apparatus as claim 1, wherein the sealing assembly has a flexible fluid conduit opening through which the flexible fluid conduit passes, and which is substantially sealably located about the flexible fluid conduit.

4. An apparatus as claimed in claim 1, wherein the sealing assembly utilizes a clamping device to releasably affix the sealing assembly to the fluid conduit.

5. A plumbing apparatus for temporarily occluding a fluid conduit to substantially prohibit the movement of a fluid therethrough, comprising:
    an expandable member which can be positioned in the fluid conduit, and which can be controllably expanded to occlude the fluid conduit and substantially prohibiting movement of the fluid therethrough, and which further can be controllably contracted to facilitate the movement of the fluid therethrough;
    a flexible fluid conduit coupled in fluid flowing relation relative to the expandable member, and which facilitates the delivery of a gas to cause the expandable member to expand, and which further facilitates the release of the gas to cause the expandable member to contract;
    a movement limiting assembly fixed on the expandable member, and which limits the movement of the expandable member along the fluid conduit; and
    a sealing assembly through which the flexible fluid conduit and the movement limiting assembly pass, and which is substantially sealably affixed about the fluid conduit to substantially prohibit the escape of the fluid therethrough, and wherein the movement limiting assembly has an end piece which cannot pass through the sealing assembly.

6. An apparatus as claimed in claim 5, wherein the end piece is circular in shape and has a diameter greater-than about 4.5 inches.

7. An apparatus as claimed in claim 5, wherein the sealing assembly has a flexible fluid conduit opening through which the flexible fluid conduit passes, and which is substantially sealably fixed about the flexible fluid conduit.

8. An apparatus as claimed in claim 5, wherein the sealing assembly utilizes a clamping device to affix the sealing assembly about the fluid conduit.

9. A plumbing apparatus for temporarily occluding a fluid conduit to substantially prohibit the movement of a fluid therethrough, comprising:
    an expandable member which has a first state, where it has a first dimension which permits it to be received within the fluid conduit which is to be occluded, and a second state, where it has a second dimension which substantially completely occludes the fluid conduit;
    a flexible fluid conduit coupled in fluid flowing relation relative to the expandable member, and which facilitates the delivery of an expandable member fluid to cause the expandable member to move to the second state, and which further facilitates the release of the expandable member fluid to cause the expandable member to move to the first state;
    a movement limiting assembly fixed on the expandable member, and which limits the movement of the expandable member along the fluid conduit; and
    a sealing assembly through which the flexible fluid conduit and the movement limiting assembly pass, and which is substantially sealably affixed about the fluid conduit to substantially prohibit the escape of the fluid therethrough, and wherein the movement limiting assembly has an end piece which cannot pass through the sealing assembly, or fluid conduit.

10. An apparatus as claimed in claim 9, wherein the end piece is circular in shape and has a diameter greater than about 4.5 inches.

11. An apparatus as claimed in claim 9, wherein the sealing assembly has a flexible fluid conduit opening through which the flexible fluid conduit passes, and which is substantially sealably fixed about the flexible fluid conduit.

12. An apparatus as claimed in claim 9, wherein the sealing assembly utilizes a clamping device to affix the sealing assembly about the fluid conduit.

13. A method for temporarily occluding a fluid conduit, to substantially prohibit the movement of a fluid therethrough, comprising:
    inserting an expandable member into the fluid conduit;
    providing a flexible fluid conduit coupled in fluid flowing relation relative to the expandable member which is utilized to move an expandable member fluid into or out of the expandable member causing the expansion or contraction of the expandable member;

causing the expandable member to expand and substantially obstruct movement of fluid along the fluid conduit;

providing a movement limiting assembly having an end piece and which is affixed to the expandable member and which limits movement of the expandable member along the fluid conduit; and providing a sealing assembly which substantially limits escape of the fluid, and through which the flexible fluid conduit and the movement limiting assembly pass, and wherein the end piece cannot pass through the sealing assembly and into the fluid conduit.

14. A method for temporarily occluding a fluid conduit to substantially prohibit the movement of a fluid therethrough, comprising:

positioning an expandable member within the fluid conduit;

providing a flexible fluid conduit coupled in fluid flowing relation relative to the expandable member, and which facilitates the delivery of an expandable member fluid to cause the expandable member to expand, and which further facilitates the release of the expandable member fluid to cause the expandable member to contract;

causing the expandable member to expand and substantially obstruct the movement of the fluid in the fluid conduit;

providing a movement limiting assembly having an end piece, and which is affixed to the expandable member and which limits movement of the expandable member along the fluid conduit;

affixing a sealing assembly to the fluid conduit and which substantially limits escape of the fluid, and through which the flexible fluid conduit and the movement limiting assembly pass, and wherein the end piece cannot pass through the sealing assembly;

causing the expandable member to contract, facilitating movement of the fluid through the fluid conduit;

removing the sealing assembly from the fluid conduit; and removing the expandable member from within the fluid conduit.

15. A method as claimed in claim 14, and further comprising delivering the expandable member fluid under pressure to the expandable member to cause the expandable member to expand.

16. A method as claimed in claim 15, and further comprising releasing the expandable member fluid which is under pressure, from the expandable member to cause the expandable member to contract.

* * * * *